United States Patent [19]

Phillips et al.

[11] Patent Number: 4,603,161

[45] Date of Patent: Jul. 29, 1986

[54] SELECTED OXYALKYLATED 2,6-DIALKYLPHENOL COMPOUNDS AND THEIR USE AS STABILIZERS OF ORGANIC MATERIALS AGAINST OXIDATIVE DEGRADATION

[75] Inventors: Steven D. Phillips, Northford; Bonnie B. Sandel, Milford, both of Conn.

[73] Assignee: Olin Corporation, Cheshire, Conn.

[21] Appl. No.: 744,606

[22] Filed: Jun. 14, 1985

[51] Int. Cl.$^4$ ................. C07C 101/26; C08K 5/17
[52] U.S. Cl. ................. 524/239; 252/51.5 R; 560/169
[58] Field of Search ............ 560/169; 568/766; 524/239, 334; 252/515 A

[56] References Cited

U.S. PATENT DOCUMENTS

| | | | |
|---|---|---|---|
| 2,428,353 | 10/1947 | Bersworth | 524/239 |
| 3,085,003 | 4/1963 | Morris | 524/334 |
| 3,285,855 | 11/1966 | Dexter et al. | 252/855 |
| 3,497,535 | 2/1970 | Lennon | 260/398.5 |
| 3,526,668 | 9/1970 | Starnes et al. | 260/624 |
| 3,563,949 | 2/1971 | Habeck et al. | 568/766 |
| 3,931,103 | 1/1976 | Hardy | 260/45.85 R |
| 3,975,360 | 8/1976 | Kline | 260/45.85 R |
| 4,012,360 | 3/1977 | Schwarzenbach et al. | 260/45.9 NC |
| 4,352,751 | 10/1982 | Wieder et al. | 560/169 |
| 4,414,408 | 11/1983 | Cottman | 560/144 |

OTHER PUBLICATIONS

Robert W. Layer, "Reactions of Epoxides with 2,6-Ditert-butylphenol", *J. Organic Chem.*, 46, pp. 5224–5225, (1981).

*Primary Examiner*—Veronica P. Hoke
*Attorney, Agent, or Firm*—William A. Simons; Thomas P. O'Day

[57] ABSTRACT

Disclosed are bis(4-oxyalkylated-2,6-dialkylphenol) adducts of ethylenediaminetetraacetic acid having the formula:

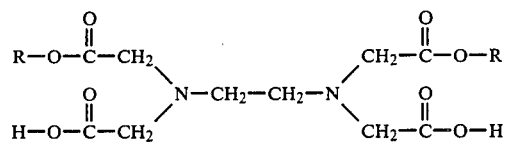

wherein each R is a 2,6-dialkyl moiety having the formula:

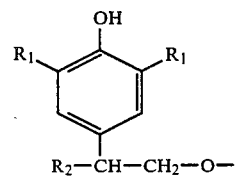

wherein each $R_1$ is selected from the group consisting of branched alkyl groups having from about 4 to about 8 carbon atoms and $R_2$ is selected from the group consisting of hydrogen, a methyl group and ethyl group.

These compounds are useful as stabilizers in organic materials against oxidative degradation.

15 Claims, No Drawings

SELECTED OXYALKYLATED 2,6-DIALKYLPHENOL COMPOUNDS AND THEIR USE AS STABILIZERS OF ORGANIC MATERIALS AGAINST OXIDATIVE DEGRADATION

BACKGROUND OF THE INVENTION

1. Field of the Invention

The present invention is directed to selected oxyalkylated 2,6-dialkylphenol compounds and their use as stabilizers of organic materials against oxidative degradation. In particular, the present invention is directed to selected bis(4-oxyalkylated-2,6-dialkylphenol) adducts of ethylenediaminetetraacetic acid as novel compositions of matter and their use as stabilizers of organic material against oxidative degradation.

2. Description of the Prior Art

Many organic materials suffer oxidative degradation. This problem is particularly acute in plastics and other synthetic polymers where degradation may readily occur under the high temperatures normally associated with their processing. Degradation also results in such polymers after long-term aging under ambient conditions. In order to stabilize or protect these organic materials from oxidative degradation, certain antioxidant chemical additives have been incorporated into these materials either before or during processing.

It is also known that certain metals (e.g. copper), when in contact with or as impurities of the organic materials, may catalyze this oxidative degradation. Thus, metal deactivating agents are incorporated in such organic materials.

Combinations of antioxidant additives are often used to improve oxidative stability. Certain combinations of antioxidants provide a synergistic amount of antioxidant activity. See U.S. Pat. No. 3,535,277, which issued to Miller et al on Oct. 20, 1970. Such combinations may be made by reacting together two or more antioxidant additives to form a single compound having two or more antioxidant moieties. This approach is taught in U.S. Pat. Nos. 4,413,077, which issued to Valdiserri et al on Nov. 1, 1983, and 4,414,408, which issued to Cottman on Nov. 8, 1983. Separately, antioxidant moieties have been chemically bonded to known metal deactivators. See U.S. Pat. No. 4,012,360 which issued to Schwarzenbach et al on Mar. 15, 1977.

2,6-Dialkyl substituted phenols are well known in the art as antioxidant moeities. Furthermore, the reaction of such moieties with other antioxidant moieties to provide multifunctional antioxidant molecules is known. See U.S. Pat. Nos. 3,285,855, which issued to Dexter et al on Nov. 15, 1966; 3,526,668, which issued to Starnes et al on Sept. 1, 1970; and 3,975,360, which issued to Kline on Aug. 17, 1976.

These 2,6-dialkyl substituted or hindered phenolic stabilizers, while being reasonably effective stabilizers for organic materials, may have operating problems associated with them. Specifically, they are known to cause discoloration or staining to some organic materials they intend to stabilize. They also may be too readily volatilized, and, therefore, will escape from the material they are stabilizing. This will result in a lowered antioxidant level and will shorten the service life of that material. These hindered phenolics are also known to be ineffective in the presence of transition metals (e.g., copper) as in the case of plastic covering for wiring or where metal impurities occur in the organic material.

In view of these facts, there is a need for new antioxidants and metal deactivators which have improved effectiveness against oxidative degradation over a wide variety of applications.

It is therefore an object of this invention to provide a new class of relatively nondiscoloring and nonvolatile hindered phenolic stabilizers for oxidizable organic materials.

It is also an object of this invention to provide a new class of hindered phenolic stabilizers which are effective in the presence of transition metals.

These and other objects of the invention will be apparent from the following detailed description of the invention.

BRIEF SUMMARY OF THE INVENTION

The foregoing objects are accomplished by the present invention which is directed to organic materials, including polyolefins, containing an effective stabilizing amount against oxidative degradation of one or more moieties derived from an oxyalkylated 2,6-dialkylphenol compound of the formula (I):

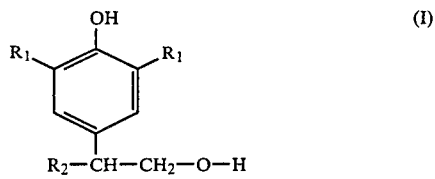

wherein each $R_1$ is selected from the group consisting of branched alkyl groups having about 4 to about 8 carbon atoms and $R_2$ is selected from the group consisting of hydrogen, a methyl group, and an ethyl group.

The present invention is also directed to the method of using these moieties derived from the oxyalkylated 2,6-dialkylphenol compounds of formula (I) as stabilizers in organic materials that are normally subject to oxidative degradation. These organic compounds include polyolefins, such as polyethylene and polypropylene.

One preferred embodiment of the present invention is directed to organic materials like polyolefins containing an effective stabilizing amount against oxidative degradation of one or more bis(4-oxyalkylated-2,6-dialkylphenol) adducts of ethylenediaminetetraacetic acid (EDTA) having the formula (II):

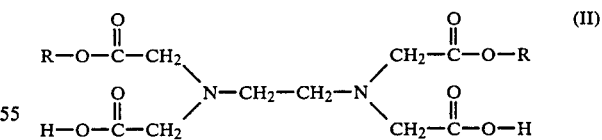

wherein each R is an oxyalkylated 2,6-dialkylphenol moiety as defined by formula (I).

The present invention is also directed to the method of using these bis(4-oxyalkylated-2,6-dialkylphenol) adducts of ethylenediaminetetraacetic acid (EDTA) as stabilizers in organic materials that are normally subject to oxidative degradation.

Still another embodiment of the present invention is directed to these bis(4-oxyalkylated-2,6-dialkylphenol) adducts of ethylenediaminetetraacetic acid of formula (II), above, as novel compositions of matter.

DETAILED DESCRIPTION

The phenolic-substituted EDTA derivatives for formula (II) may be prepared by a two-step reaction wherein ethylene oxide (EO) or propylene oxide (PO) or butylene oxide (BO) is reacted with the corresponding 2,6-dialkylphenol under Lewis acid catalyzed conditions to form the 4-EO or 4-PO-substituted 2,6-dialkylphenol. This intermediate is then reacted with the bis(anhydride) of EDTA to form a compound of formula (II). This two-step reaction is illustrated in the following reaction equations (A) and (B) where 2,6-ditert-butylphenol and propylene oxide are used as starting material.

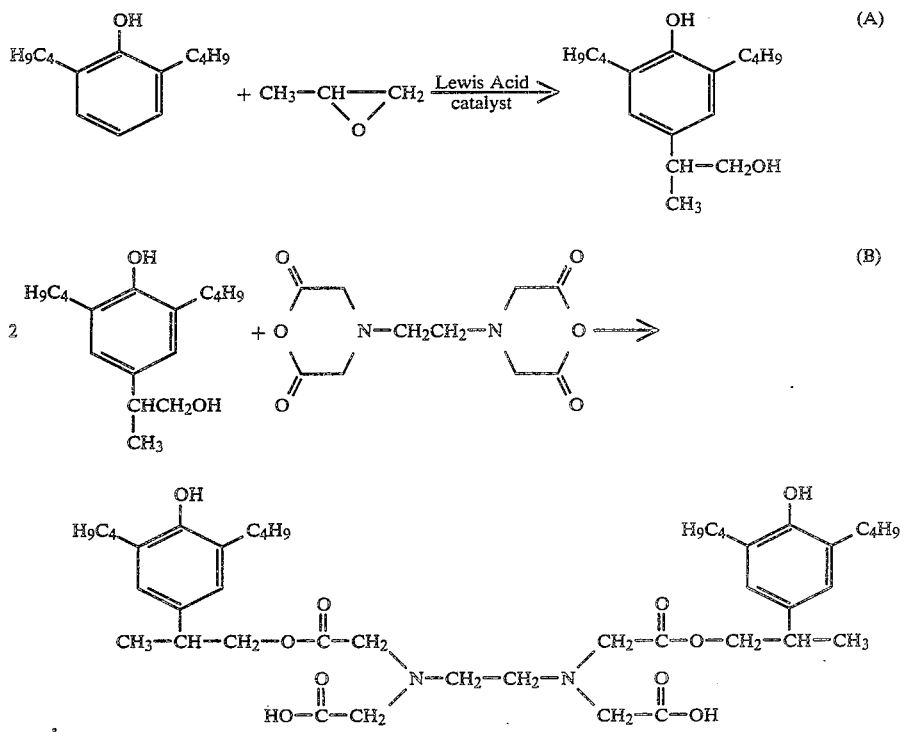

The acid catalyzed step of reaction (A) is an improvement over the similar known base catalyzed process because no O-alkylation occurs at the hydroxide group.

The phenols which may be used as starting reactants for the present products include those of the following formula (III):

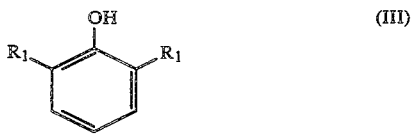

wherein each $R_1$ is as defined above. Preferred branched alkyl substituents $R_1$ include isobutyl, t-butyl, isohexyl and the like. The most preferred $R_1$ group is t-butyl.

The term "Lewis acid catalyst" as used in the present specification and claims refers to any and all electron acceptors which are suitable to catalyze substitution reactions on an aromatic nucleus. These catalysts include metal halides, acids, acid anhydrides and halides of certain metalloids. Examples include $AlCl_3$, $AlBr_3$, $FeCl_3$, $PCl_3$, $BF_3$, $ZnCl_2$, $TiCl_4$, HF, $H_2SO_4$, $H_3PO_4$, $P_2O_5$ and $SnCl_4$.

The reaction of step (A) is readily carried out by placing the reaction mixture components, namely, the 2,6-substituted phenol, the Lewis acid catalyst and ethylene or propylene oxide, in a reaction vessel having agitation means. The process is preferably conducted under an anhydrous and inert atmosphere (e.g. nitrogen). The mode of addition is not critical, although it is convenient to initially add the phenolic starting material dissolved in an appropriate solvent to a stirred mixture of the Lewis acid catalyst in the same solvent. The ethylene oxide or propylene oxide or butylene oxide may be dissolved in the same solvent and then added to the reaction vessel.

Preferred solvents are aprotic in nature and include hydrocarbons, halogenated hydrocarbons, alcohols and ethers. Examples of these include benzene, toluene, tetrachloroethane chlorinated benzenes, xylenes, p-cymene. For best results, an excess of ethylene oxide or propylene oxide is employed. In this regard, it is convenient to use a range of from about 1.5 to about 5.0 moles ethylene oxide (EO) or propylene oxide (PO) or butylene oxide (BO) for each mole of 2,6-dialkylphenol.

The reaction of step (A) may occur over a temperature range of about $-70°$ C. to about $100°$ C. It is more preferable to conduct that reaction step at about $-30°$ C. to about $30°$ C. Atmospheric pressure is preferred. However, this reaction may be carried out at any suitable reaction pressure.

This reaction is preferably carried out for a time sufficient to allow for optimum yield. The preferred reaction time will depend on temperature and other reaction parameters such as solvent and reactants used.

The above-noted reaction step (B) between the bis(anhydride) of EDTA and the 4-EO-, 4-PO-, or 4-BO-adduct of a 2,6-dialkylphenol is also preferably carried out in an inert solvent. The same inert solvent which may be utilized in the first reaction step may also be employed for this reaction step.

This reaction is readily carried out by placing the starting components, namely, the substituted phenol, the bis(anhydride) of EDTA and a suitable solvent in a reaction vessel having agitation means. Like the reaction in step (A), this step is preferably conducted under an anhydrous and inert atmosphere (e.g. nitrogen). The mode of addition to these components is not critical.

The preferred reaction temperatures for this reaction (B) are from about 50° C. to about 150° C. It is preferred to conduct the reaction at the reflux temperature of the solvent employed. Atmospheric reaction pressure is preferred, but lower or higher pressures may be suitable.

The reaction time will depend upon the reaction temperature and other factors such as the particular solvent and reaction vessel used. Normally, reaction times in the range from about 5 to about 10 hours are employed.

In accordance with the present invention, the compounds of formulae (I) and (II), above, may be utilized as effective stabilizers of organic materials against oxidative degradation. In practicing the process of the present invention, an effective stabilizing amount of one or more of these compounds is added to an organic material normally subject to oxidation degradation such as polyolefins (e.g. plastics and the like) or functional fluids (e.g. hydrocarbon distillate fuels, hydrocarbon lubricant oils and greases and non-hydrocarbon or synthetic oil base stocks, distillate fuels, lubricant oils and greases) or fats or natural oils. It is to be understood that the term "effective stabilizing amount against oxidative degradation" as used in the specification and claims herein is intended to include any amount that will prevent or control the oxidative degradation of said organic material or will act to deactivate metals in said organic material. The term "oxidative degradation" as used herein includes both non-catalyzed oxidation and transition metal-catalyzed (e.g. copper-catalyzed oxidation) caused by thermal or long-term aging effects or the like. Of course, this stabilizing amount may be constantly changing because of the possible variations of many parameters. Some of these parameters include the specific organic material to be protected; the specific compound of the present invention used as an antioxidant; the geometry and environment of the organic material to be protected; temperature; and the like.

The antioxidant compounds of this invention may be preferably used in concentrations ranging from about 0.001% to about 10% by weight of the organic material. More preferably, this concentration may range from about 0.005% to about 5% by weight of the organic material.

Polyolefins in which the compounds of this invention may be added include α-olefin polymers, such as polyethylene (including crosslinked), polypropylene, polyisobutylene, polybutene-1, polymethylbutene-1, polymethylpentene-1, polyisoprene and polybutadiene. Also included are copolymers of the monomers of which the above homopolymers are based, such as ethylenepropylene copolymers, propylene-butylene-1 copolymers, ethylene-butylene-1 copolymers, ethylene-hexene-1 copolymers, propylene-isobutylene copolymers, styrene-butadiene copolymers, and terpolymers of ethylene and propylene with a diene (e.g. hexadiene, dicyclopentadiene or ethylidenenorbornene). Also included are mixtures of the above-mentioned homopolymers, such as a mixture of polypropylene and polyethylene, polypropylene and polybutene-1, or polypropylene and polyisobutylene. Polypropylene and polyethylene, as well as copolymers and polymer mixtures containing propylene and ethylene units, are preferred.

The invention of the compounds of the present invention into organic material may be effected by any conventionally known method for adding antioxidants or metal deactivators to organic materials. In the case of polyolefins as the substrate, it may be advantageous to add or mix the compounds of the present invention either before, during or after the polymerization reaction. If done after the polymerization, they may be mixed into the polymer melt either before or during shaping or by applying a dispersion of these compounds to the surface of shaped polymeric article.

Various known inhibitors and additives may also be added with the antioxidant compounds of this invention to the organic composition such as functional fluids. These other additives and inhibitors further control or modify various chemical and physical properties of polyolefins. The general term "inhibitor" is used for those additives which increase resistance to chemical changes.

Included among the various types of other additives which may be added to polyolefins of this invention are: other antioxidants, antiozonants, thermal stabilizers, ultraviolet light absorbers, coloring materials, dyes, pigments, other metal chelating agents, and the like. The polyolefins stabilized by the addition of compounds of this invention are in particular suitable for use as coating materials for copper-containing wiring and the like.

Included among the various types of other additives which may be added to the functional fluids of this invention are: inhibitors for pH and corrosion control, other antioxidants, rust inhibitors, viscosity-index improvers, pour-point depressants, wear additives, lubricating additives, antifoaming agents, metal deactivators, metal passivators, stabilizers, deemulsifiers, dyes, and odor supressants.

Generally, the total amount of other additives which may be incorporated into the organic composition will vary depending on the particular composition and the desired properties. More particularly, the total amount of other additives will comprise from 0 to 20 percent and preferably from 0.1 to 8.0 percent by weight based on the total weight of the organic composition.

The following Examples further illustrate the present invention. All parts and percentages are by weight unless otherwise explicitly stated.

EXAMPLE 1

Preparation of 2-(3,5-Di-tert-butyl-4-hydroxyphenyl)propanol

To a stirred solution of 34.3 g (0.166 mole) 2,6-di-tert-butylphenol in 300 ml chlorobenzene, 10 ml (0.086 mole) stannic chloride was added under a nitrogen atmosphere. During the addition a slight increase in temperature (~1° C.) was observed. To the resulting orange solution, 9.65 g (0.166 mole) propylene oxide in 20 ml chlorobenzene was added over a period of 5 minutes as stirring was continued. Ice-bath cooling was used to maintain the temperature of the resulting exothermic reaction below 35° C. The ice-bath cooling was removed and the solution was stirred for an additional 2.5 hours at room temperature.

The product in the orange solution was then recovered by first pouring the solution into a mixture of water (~300 ml) and methylene chloride (~200 ml) and solid sodium bicarbonate (catalyst decomposer) was added until the evolution of gas ceased. The organic phase was then separated, washed with water (2×300 ml) and dried (MgSO$_4$). Flash evaporation of the solvents gave a yellow-orange oil which was distilled in vacuo to give five fractions. The fifth fraction (7.03 g) solidified on cooling to give a white solid which was shown to contain the crude product by gas chromatography (GC). Fractions 1-4 were shown to contain chlorobenzene and the starting 2,6-di-tert-butylphenol by GC.

The crude product was recrystallized from hexane to give 4.67 g (11% yield) of the desired product as colorless needles. The recrystallized product was identified as the desired compound by IR and NMR analysis and by elemental analysis:

Anal. Calc. for $C_{17}H_{28}O_2$: C, 77.22; H, 10.67, Found: C, 77.03; H, 10.54.

EXAMPLE 2

Alternative Preparation of 2-(3,5-Di-tert-butyl-4-hydroxyphenyl)propanol

To a stirred slurry of 66.7 g (0.5 mole) aluminum chloride in 250 ml toluene, 103.0 g (0.5 mole) 2,6-di-tert-butylphenol dissolved in 250 ml toluene was slowly added through a dropping funnel under a nitrogen atmosphere and under dry ice/acetone bath cooling so as to maintain the temperature of the mixture at −25° C. to −20° C. The addition was complete in 10 minutes. To the resulting orange-yellow slurry, 87.0 g (1.5 mole) propylene oxide dissolved in 250 ml toluene dropwise with stirring was slowly added over a period of 1.5 hours while maintaining the temperature at −35° C. to −30° C. After stirring for an additional 0.5 hours, the mixture was worked up as described in Example 1 to give 21.2 g (16% yield) of the desired product as colorless needles. This product proved identical to that obtained in Example 1 based on IR and NMR analysis.

EXAMPLE 3

Preparation of EDTA Symmetric Bis[2-(3,5-di-tert-butyl-4-hydroxyphenyl)propyl]Ester A mixture of 2.6 g (0.01 mole) bis(anhydride) of ethylenediaminetetraacetic acid (EDTA) and 5.3 g (0.02 mole) 2-(3,5-di-tert-butyl-4-hydroxyphenyl)-propanol in 30 ml acetonitrile was refluxed gently under a nitrogen atmosphere for 20 hours at about 80° C. The resulting cloudy reaction mixture was filtered to remove unreacted EDTA bis(anhydride) and any by-product formed. The filtration removed a very small amount of a tan precipitate. This tan precipitate was then washed twice on the filter with 10 ml of hot acetonitrile. The combined filtrate and hot acetonitrile washings were flash evaporated to near dryness to give an almost colorless crystalline solid which was recrystallized in benzene-petroleum ether. Thus, 6.3 g (80% yield) of a colorless crystalline solid was obtained, mp 66°-67° C. with decomposition. The structure was confirmed by $^1$H NMR and $^{13}$C NMR and by elemental analysis:

Anal. Calc. for $C_{44}H_{68}N_2O_{10}$: C, 67.32; H, 8.73; N, 3.57, Found: C, 67.14; H, 8.77; N, 3.38.

INDUCTION PERIOD SCREENING FOR 40% CYCLOHEXENE/60% HEPTANE

The procedures of ASTM D525 as modified for automatic data acquisition were followed to measure the effect of the compounds of Examples 2 and 3 on the induction period of the test fluid (40% cyclohexene/60% heptane). The screening protocol involved measuring the induction period increase in minutes of the test fluid containing 10 mg/L of additive over a standard test fluid containing no additive. The induction period increase (IPI) over the standard was also measured in the presence of 0.1 mg/L Copper (II) ion in the test fluid containing 10 mg/L additive in order to measure potential metal deactivating activity of the antioxidant.

The screening results for these compounds is outlined in TABLE I. The induction period increase is the increase in the amount of time before the onset of oxidative degradation relative to the onset of oxidation degradation in the unstabilized fluid. The numbers are recorded in minutes. Therefore, the induction period increase is equal to (Induction period of fluid + test additive)—(Induction period of fluid).

TABLE I

| Example | Induction Period Increase (IPI) | IPI in the presence of Copper (II) Ions |
| --- | --- | --- |
| 2 | 253.0 | −3.7 |
| 3 | 153.0 | 204.0 |

SCREENING IN POLYOLEFINS

Several antioxidants, including the compound of Example 3, above were incorporated into two standard test resins (i.e. polypropylene and linear low density polyethylene) along with any processing aids by room temperature twin-shell blending of all ingredients for a sufficient period of time (4-24 hours) to yield a homogeneous mixture. The level of antioxidant additive ranged from 0.01% to 1.5% depending on the type of subsequent screening (i.e. oven aging and melt index).

The blended homogeneous mixtures were then separately extruded through a Brabender single screw extruder set at an appropriate temperature profile (i.e. 200°-260° C. for both polypropylene and linear low density polyethylene). An adjustable ribbon die was used to extrude sheets of varying thickness (5-50 mil films) and a rod die was used for extrusion with subsequent pelletization with a Brabender Pelletizer. The extruded sheets and pellets were used for oven aging and melt index screening, respectively.

A. Screening In Polypropylene

All antioxidant candidates were extruded in Hercules 6501 polypropylene resin at a concentration of 0.2%. The adjustable ribbon die was set to produce a 25 mil sheet. Samples (~3×4 inches) were cut from the sheet and oven aged at 150° C. in a forced air oven. Hunter color readings were measured on the initial sheet and on the sheet at failure. Yellowness index data and hours to failure for these antioxidant compounds are outlined in TABLE II. The yellowness index was measured with a Hunter color apparatus. The higher the number, the more yellow the polymer is, which of course is undesired. In the case of no additive, good color is observed. Therefore, the color test does not measure polymer degradation. Failure is defined as the hours required in the hot air oven for loss of polymer properties (e.g. plasticity). The higher the number, the longer the time the antioxidant stabilizes the polypropylene against degradation.

As can be seen in TABLE II, the antioxidant of Example 3 compares favorably against standard commercially available antioxidants in both the color and time to failure tests.

TABLE II

| Compound | Yellowness Index Initial | Yellowness Index Failure | Hours to Failure |
|---|---|---|---|
| Polypropylene alone | 0.49 | a | 24 |
| Product of Example 3 | 2.76 | 16.99 | 70 |
| WYTOX PAP b | 7.18 | 28.09 | 47 |
| IRGANOX 1076 c | 0.81 | 12.24 | 116 |
| CYANOX 1790 d | 5.14 | 37.09 | 116 | a Yellowness index could not be read at failure due to the brittleness of the sample.
b WYTOX PAP is a polymeric hindered phenol antioxidant commercially available from Olin Corporation of Stamford, Connecticut.
c IRGANOX 1076 is a medium molecular weight hindered phenol antioxidant commercially available from Ciba-Geigy Corporation of Hawthorne, New York.
d CYANOX 1790 is a high molecular weight hindered phenol antioxidant commercially available from American Cyanamid Company of Stamford, Connecticut.

B. Screening In Polyethylene

All antioxidant candidates were extruded in Exxon linear low density polyethylene resin (LLDPE) (melt index 0.760/density 0.918) at a concentration of 0.05%. Two extrusion dies were used (i.e. a ribbon die adjusted to give 25 mil sheets and a rod die which was used in conjunction with a Brabender pelletizer).

The sheets were extruded using two formulations for each candidate. The first formulation incorporated the candidate additive alone, and the second formulation incorporated the candidate additive with 0.05% by weight WYTOX 312 and 0.75% by weight calcium stearate. The films were aged in a forced air oven at 60° C. for 30 days. Hunter color readings were read on the initial sheets and also after 15 and 30 days of oven aging. The results are outlined in TABLE III. WYTOX 312 is tris nonylphenyl phosphite antioxidant synergist made by Olin Corporation of Stamford, Conn. and used to help control color problems with hindered phenols. Calcium stearate is a lubricant for processing. The data shown in TABLE III indicates that the antioxidant of Example 3 is less discoloring over a period of time as compared to standard commercially available antioxidants.

In the rod die extrusion followed by the pelletization test, the formulation incorporated the candidate additive alone. Melt Indexes (MI) were measured during multiple extrusions for these samples. The results are outlined in TABLE IV. The Melt Index is a measure of polymer degradation. Generally with polyethylene a lower Melt Index means more polymer degradation via crosslinking. Accordingly, high MI values are desired. As seen in TABLE IV, the product of Example 3 compares favorably with the known standards.

TABLE III

| Compound | Formulation a | Yellowness Index Initial | 15 days | 30 days |
|---|---|---|---|---|
| Exxon LLDPE alone | A | −0.85 | 0.52 | 0.38 |
| | B | −1.09 | 0.08 | −0.06 |
| Product of Example 3 | A | −0.46 | 0.74 | 0.71 |
| | B | −0.63 | 1.15 | 1.62 |
| CYANOX 1790 | A | 8.83 | 13.77 | 14.51 |
| | B | 3.55 | 8.58 | 11.07 |
| IRGANOX 1076 | A | 0.74 | 3.59 | 5.05 |
| | B | −0.30 | 2.98 | 5.48 | a Formulation A = 0.05% candidate additive
Formulation B = 0.05% candidate additive plus 0.05% WYTOX 312 plus 0.075% calcium stearate.

TABLE IV

| Compound | Melt Index First Extrusion | Second Extrusion | Third Extrusion |
|---|---|---|---|
| Exxon LLDPE alone | 0.533 | 0.493 | 0.459 |
| Product of Example 3 | 0.619 | 0.606 | 0.610 |
| CYANOX 1790 | 0.657 | 0.614 | 0.604 |
| IRGANOX 1076 | 0.669 | 0.637 | 0.649 |

What is claimed is:

1. An oxidation-inhibited organic material comprising an organic material normally subject to oxidative degradation containing an effective stabilizing amount against oxidative degradation of a bis(4-oxyalkylated-2,6-dialkylphenol) adduct of ethylenediaminetetraacetic acid having the formula:

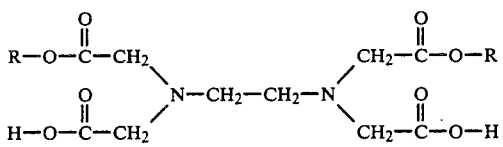

wherein each R is a 2,6-dialkylphenol moiety having the formula:

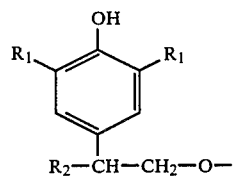

wherein each $R_1$ is selected from the group consisting of branched alkyl groups having from about 4 to about 8 carbon atoms and $R_2$ is selected from the group consisting of hydrogen, a methyl group and an ethyl group.

2. The oxidation-inhibited organic material of claim 1 wherein said organic material is a polyolefin.

3. The oxidation-inhibited polyolefin of claim 1 wherein said polyolefin is an α-olefin polymer.

4. The oxidation-inhibited α-olefin polymer of claim 3 wherein said α-olefin polymer is polypropylene or polyethylene.

5. The oxidation-inhibited organic material of claim 1 wherein $R_1$ is tert-butyl and $R_2$ is methyl.

6. The oxidation-inhibited organic material of claim 1 wherein said effective stabilizing amount against oxidative degradation is from about 0.001% to about 10% by weight of said organic material.

7. A method for inhibiting the oxidation of organic material which comprises adding to said organic material an effective stabilizing amount against oxidative degradation of a bis(4-oxyalkylated-2,6-dialkylphenol) adduct of ethylenediaminetetraacetic acid having the formula:

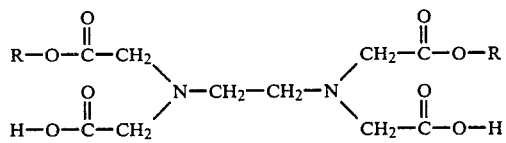

wherein each R is a 2,6-dialkyl moiety having the formula:

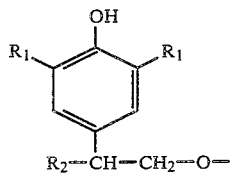

wherein each $R_1$ is selected from the group consisting of branched alkyl groups having from about 4 to about 8 carbon atoms and $R_2$ is selected from the group consisting of hydrogen, a methyl group and an ethyl group.

8. The method of claim 7 wherein each $R_1$ is a tert-butyl group.

9. The method of claim 7 wherein $R_2$ is a methyl group.

10. The method of claim 7 wherein said effective stabilizing amount against oxidative degradation is from about 0.001% to about 10% by weight of said organic material.

11. The method of claim 10 wherein said effective stabilizing amount against oxidative degradation is from about 0.005% to about 5% by weight of said organic material.

12. A compound for the formula:

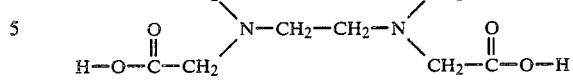

wherein each R is a 2,6-dialkyl moiety having the formula:

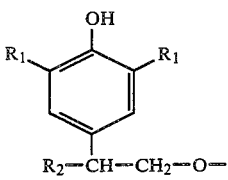

wherein each $R_1$ is selected from the group consisting of branched alkyl groups having from about 4 to about 8 carbon atoms and $R_2$ is selected from the group consisting of hydrogen, a methyl group and an ethyl group.

13. The compound of claim 12 wherein each $R_1$ is a tert-butyl group.

14. The compound of claim 12 wherein $R_2$ is a methyl group.

15. The compound of claim 12 wherein each $R_1$ is a tert-butyl group and each $R_2$ is a methyl group.

* * * * *